United States Patent [19]

Leehey

[11] Patent Number: 4,879,899
[45] Date of Patent: Nov. 14, 1989

[54] SHEAR STRESS GAUGE
[75] Inventor: Patrick Leehey, Swampscott, Mass.
[73] Assignee: Massachusetts Institute of Technology, Cambridge, Mass.
[21] Appl. No.: 186,891
[22] Filed: Apr. 27, 1988
[51] Int. Cl.⁴ ............................................. G01M 9/00
[52] U.S. Cl. ..................................................... 73/147
[58] Field of Search .......................................... 73/147
[56] References Cited
U.S. PATENT DOCUMENTS
4,475,385 10/1984 Farmer ................................... 73/147

Primary Examiner—Donald O. Woodiel
Attorney, Agent, or Firm—Fish & Richardson

[57] ABSTRACT

An elongate body having a longitudinal axis oriented transverse to fluid flow. The body is disposed within the viscous sublayer of the turbulent boundary layer flow across a wall, the body having a plane of symmetry passing through the longitudinal axis of the body and normal to the wall. Torsional springs support the body for deflections about the longitudinal axis and deflections are measured. The angular deflections about the longitudinal axis are substantially linearly related to shear stress on the wall.

12 Claims, 4 Drawing Sheets

Plot of the velocity field for the buried gauge

Plot of the velocity field for the cylindrical gauge

SHEAR STRESS GAUGE

The Government has rights in this invention pursuant to Contract No. N00014-86-K-0183 awarded by the Department of the Navy.

BACKGROUND OF THE INVENTION

This invention relates to a shear stress gauge for measuring fluctuating shear stress created on a wall by fluid flow over the wall. The gauge is particularly applicable to the measurement of mean and fluctuating shear stress components under a turbulent boundary layer.

A variety of techniques have been used for the measurement of wall shear stress. For mean wall shear stress measurement, it is customary to use a Preston tube. This technique depends upon the assumption of a wall law for the flow. This law applies only for equilibrium boundary layers and is not valid for many turbulent or transitional flows. Surface hot film gauges have become very popular in recent years, largely because of their simplicity in installation. Such gauges are never calibrated by the manufacturer; calibration must be done by the individual investigator. As a result, most hot film gauge measurements are qualitative in nature rather than quantitative. The heat transfer characteristics of the substrate adjacent to such gauges are very important to their performance, particularly in air.

Certain other techniques such as the photographing of path lines created with fluorescent dyes, and electrochemical methods have been used from time to time to measure wall shear stress. Only two present techniques for measurement are linear: the floating element surface gauge and the pulsed wire gauge. The deflection of the floating element surface gauge is determined by a capacitance or similar measurement. This gauge has a serious deficiency in that it must have a peripheral gap separating it from the adjacent wall. A mean pressure gradient in the outer flow will cause fluid flow in the gap which results in the gauge responding erroneously to differential gap pressure. The pulsed wire gauge measures the time it takes for a heated spot of fluid generated at one wire to convect to a second sensing wire downstream, thus determining the streamwise flow velocity very near the wall. Both the floating element and the pulsed wire gauges have very limited dynamic response and spatial resolution. In addition to the qualitative nature of the measurements utilizing hot film gauges, these gauges are incapable of detecting flow reversal. Moreover, because of their nonlinearity, mean flow measurements are highly contaminated by the large fluctuating shear component at the wall under a turbulent boundary layer. Therefore, they can be calibrated only in a fully developed turbulent flow.

Measurements of unsteady wall shear stress by various known techniques show a tremendous scatter for the same type of flow. The spread in the ratio of mean square shear stress to mean wall shear stress is from 5% to 50%, depending on which experimental technique is used. At the wall, one is dealing with something very different from the conventional hot wire measurement in the main portion of the boundary layer. There the largest ratio of r.m.s. to mean is customarily of the order of 5%. At the wall, when a nonlinear device is used, such as for all techniques except the floating element and pulsed wire methods, the fact that the fluctuating wall shear stress value is a very high fraction of the mean shear stress implies that the mean measurement itself is badly contaminated by the turbulence. It has been customary in the past to calibrate Preston tubes and hot film gauges by comparing their output to the pressure drop in fully developed turbulent pipe flow. Clearly, this technique is not really valid in any other type of turbulent flow except one with the same dynamic characteristics as the pipe flow itself.

SUMMARY OF THE INVENTION

According to the invention, the shear stress gauge includes an elongate body having a longitudinal axis oriented transverse to fluid flow with the body disposed within the viscous sublayer of the turbulent boundary layer flow across a wall. The body has a plane of symmetry passing through the longitudinal axis of the body and normal to the wall. Apparatus such as torsional springs support the body for deflections about the longitudinal axis and deflection measuring apparatus is provided which is responsive to the angular deflection about the longitudinal axis. The angular deflection is substantially linearly related to the shear stress on the wall.

The body may be of rectangular, elliptic or circular cross section. The Reynolds number of the gauge, based upon its thickness and the flow velocity at the gauge centerline is less than 4. The transverse dimension, however, may be arbitrarily large. The body may be mounted in the flow above the wall on torsional springs. The body is either suspended above the wall on end supports or has, at most, a single line contact with the wall. In one embodiment of the invention, the gauge is recessed into the wall. The gauge must be sufficiently small to permit it to operate well within the viscous sublayer of the turbulent boundary layer flow. The gauge responds linearly to a uniform shear in the flow in both torsion and drag. There is no vertical lift component.

The angular deflection of the gauge can be measured by the reflection of a laser light beam. Alternatively, the lower side of the gauge and a portion of the wall can form two plates of a differential capacitor which senses the angular deflection of the gauge using a resonant capacitive circuit. A further alternative is to sense the gauge angular displacement by use of one or more fiber optic displacement sensors. The gauge may have any cross-section provided it is symmetric about a transverse center line plane normal to the wall in the at-rest condition. It is not necessary that the cross-sections be uniform spanwise. The torsional spring constraints can be of various forms including cantilever beams, streamwise support wires under tension, or in the form of spiral torsional springs. A further desirable modification is to provide an active feedback circuit to restore the gauge to its equilibrium condition. The signal from the feedback circuit is utilized as the measurement signal. This approach will provide the added advantage of eliminating any possible vertical force response of the gauge in a deflected condition.

In contrast to a floating element gauge, which measures the drag force at the wall, the gauge of the present invention is in the flow and measures the torque generated by the local shear near the wall and thus capitalizes upon this unique property of creeping flow. The present gauge is inherently insensitive to pressure fluctuations, producing no force normal to the wall in the undeflected condition. Further, the torque measurement is insensitive to the displacement of the gauge from the wall, and is further insensitive to any blocking effect of the gauge upon the flow. The present gauge overcomes the inadequate frequency response and spatial resolution of linear devices such as floating element and pulse wire gauges. The present gauge is capable of detecting flow reversal which cannot be accomplished with surface hot film gauges. Furthermore, because the gauge of the present invention is linear, mean flow measurements are not contaminated by the large fluctuating shear components at the wall under a turbulent boundary layer. Potential commercial applications of the gauge of the present invention include all forms of measurement of shear stress beneath turbulent boundary layers, including the flow over aircraft wings, the flow over ship hulls and sonar domes, and the flow in fluid power devices, such as nuclear reactors, steam turbines, and various forms of control and pressure valves. Because of the very small size of the gauges, they can be used in biomedical applications, particularly involving shear flow interactions with cell structure in blood vessels. Arrays of the gauges of the invention may also be used as control devices in the active control of flexible surfaces for purposes of drag reduction.

DESCRIPTION OF THE PREFERRED EMBODIMENT

Figure 1:
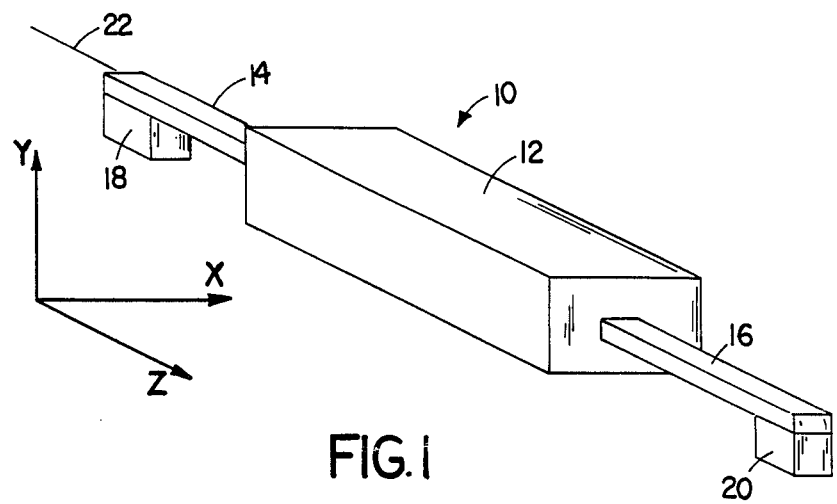
FIG. 1 is a perspective, schematic view of the shear stress gauge of the invention.

With reference to FIG. 1, a shear stress gauge 10 includes an elongate body 12 which serves as a sensor head and is supported by torsion beams 14 and 16. The torsion beams 14 and 16 rest on supports 18 and 20. The gauge 10 has a longitudinal axis 22 parallel to the Z axis shown in FIG. 1. Fluid in uniform shearing motion (not shown) flows in the X axis direction. The gauge 10 is mounted near a wall (not shown) which is in the X-Z plane. As stated earlier, the body 12 may have virtually any cross-section such as rectangular, elliptical, or circular. The body 12 has a vertical plane of symmetry passing through the center line of the body 12 and normal to the wall in the X-Z plane.

Figure 2:
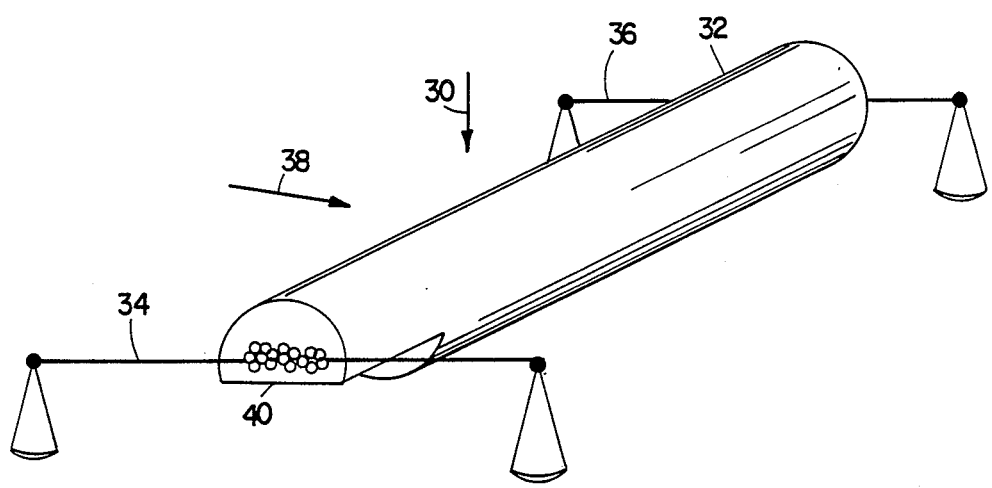
FIG. 2 is a perspective view of a test gauge.

FIG. 2 is the configuration of a test gauge successfully demonstrated at the Massachusetts Institute of Technology. A gauge 30 includes a cylinder 32 having a circular cross-section. The cylinder 32 is 0.8 millimeter in diameter and has a length of 7.5 millimeter. The gauge is installed with its center line transverse to the mean shear flow. In this embodiment, torsional springs 34 and 36 were pieces of 0.025 millimeter diameter platinum wire under tension installed at the center line at either end of the cylinder 32 with the wires 34 and 36 extending in the flow direction indicated by an arrow 38. As can be seen in FIG. 2, the cylinder 32 includes a flat portion 40 for determining angular deflection by a mirror and laser arrangement to be discussed in conjunction with FIG. 4 below.

Figure 3:
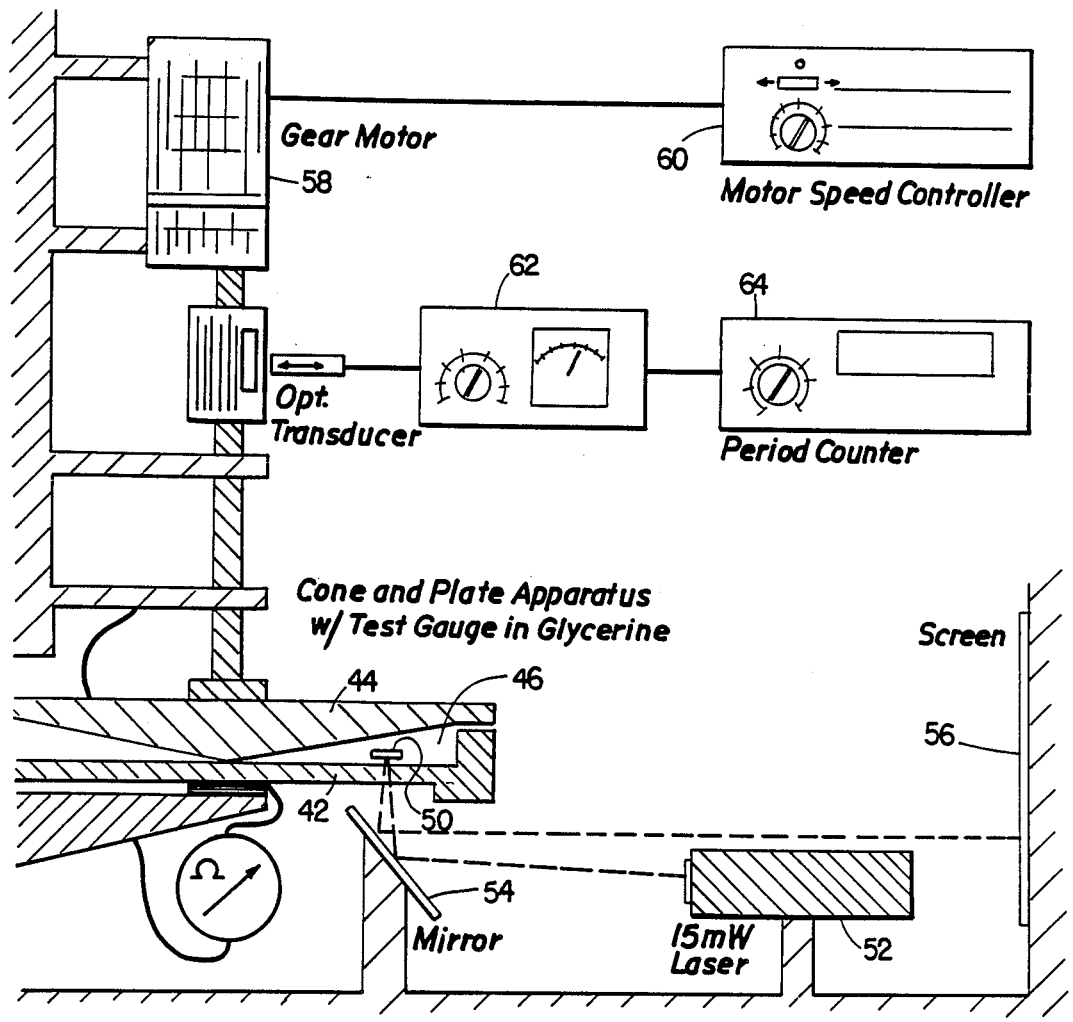
FIG. 3 is a schematic illustration of experimental equipment for testing the gauge of the invention.

The gauge of the present invention has been tested utilizing a cone and plate apparatus shown in FIG. 3. This apparatus includes a flat, fixed circular plate 42 above which spins a cone 44. Glycerin 46 is disposed between the fixed circular plate 42 and the spinning cone 44 serving as a test fluid and providing a Reynolds number of less than one throughout the apparatus insuring a uniform laminar creeping flow. A gauge 50 according to the invention is disposed between the fixed plate 42 and spinning cone 44 of the cone and plate apparatus. In the experimental arrangement, a 1.5 mW laser 52 illuminates the gauge 50 via a fixed mirror 54. A suitable laser 52 is a 1.5 mW laser such as a Metrologic He-Ne laser ML820. Light reflected from the gauge 50 reflects from the mirror 54 onto a screen 56. The position of light on the screen 56 is directly proportional to the deflection of the gauge 50. A gear motor 58 such as a Bodine NSN11-03 drives the cone 44 under the control of the speed controller 60 such as a Minarik motor controller SL15. An optical transducer 62 and period counter 64 are also included. A suitable optical transducer 62 is available from Mechanical Technology, Inc. under Model No. UO-45A and a suitable period counter 64 is a data precision counter 1571.

Figure 4:
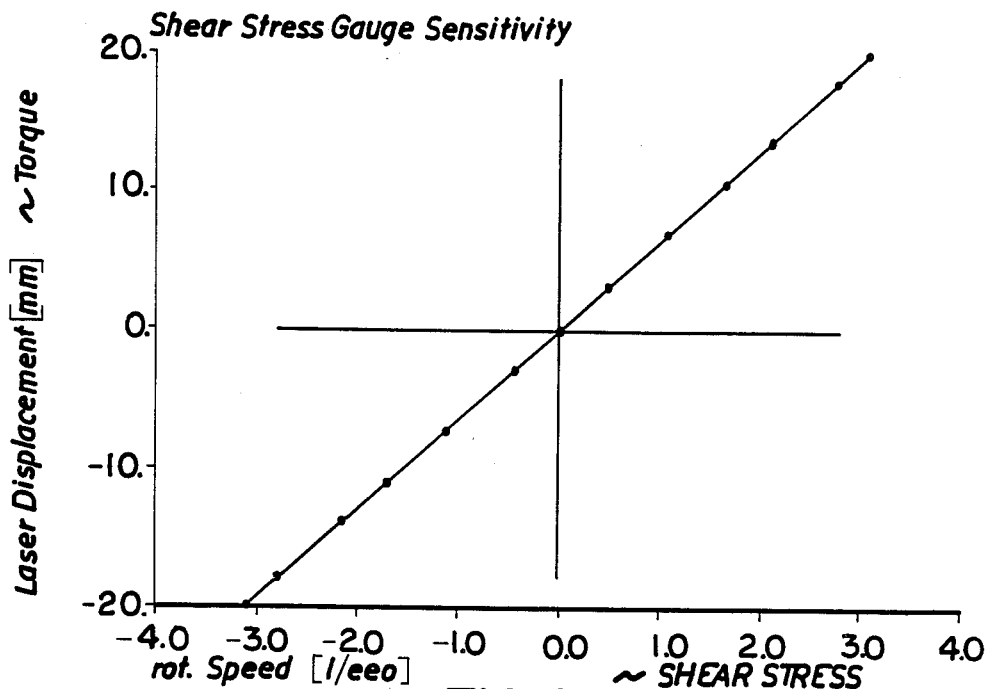
FIG. 4 is a graph of gauge output versus shear stress.

The gauge 50 was mounted as shown in the arrangement of FIG. 2 and its characteristics measured. FIG. 4 is a graph of the laser measured angular displacement of the gauge 50 versus rotational speed of the cone 44. Note that the angular displacement is linearly related to cone rotational speed which itself is proportional to shear stress on the fixed plate 42. In the experimental arrangement shown in FIG. 3, the cone 44 was a 6° cone and the gauge to screen distance was 1.8 meters. FIG. 4 shows that in addition to being completely linear, the gauge operates in both directions of shear. There was no measured hysteresis in response upon reversal of flow direction.

Figure 5:
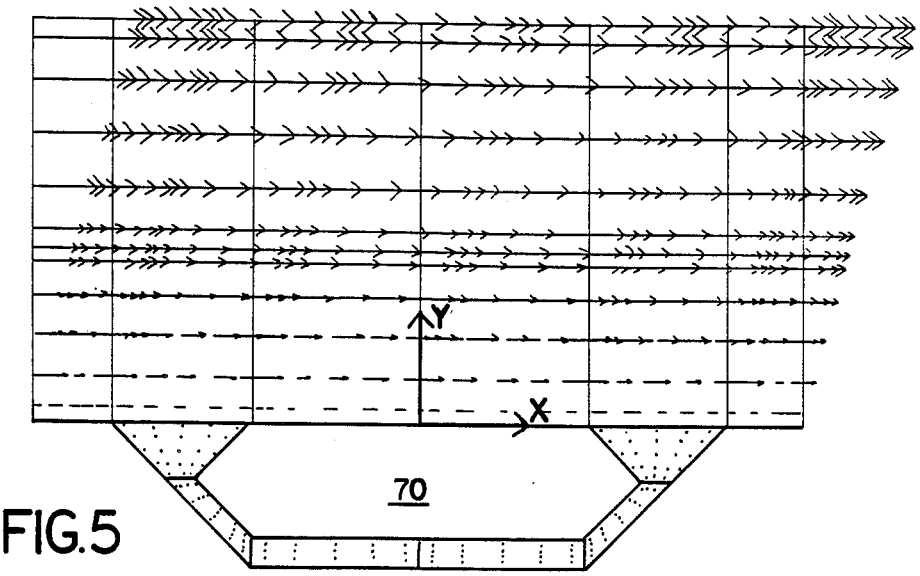
FIG. 5 is a cross-sectional view of another embodiment of the shear stress gauge of the invention along with a plot of the velocity field.

In FIG. 5, a gauge 70 is a buried gauge adapted to be recessed with respect to the flow. The gauge 70 is suspended in the same manner as the cylindrical gauge shown in FIG. 2. The Reynolds number restriction noted above on gauge size, however, is essentially removed for the buried gauge 70.

Figure 6:
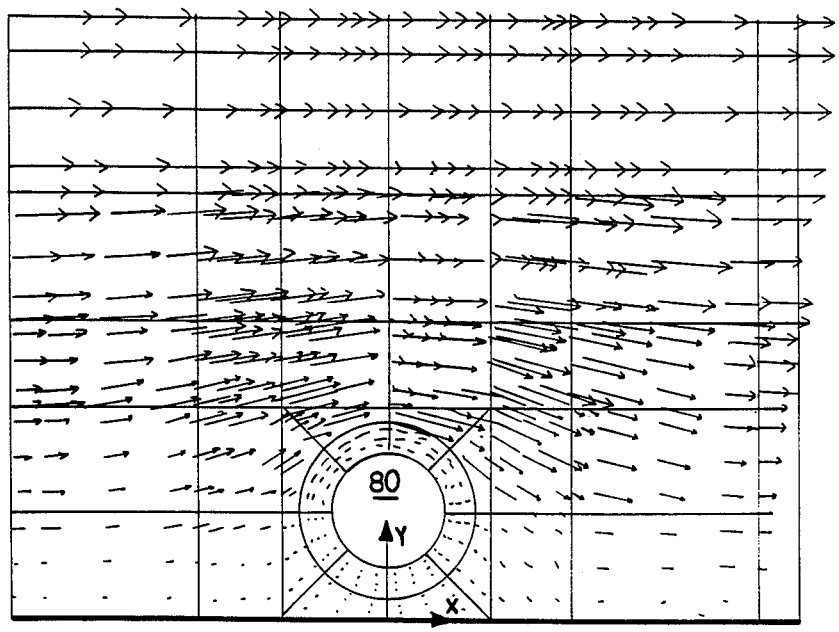
FIG. 6 is a plot of the velocity field for a cylindrical gauge.

Digital spectral element calculations have been carried out for both a cylindrical gauge 80 (FIG. 6) and the buried gauge 70 of FIG. 5. Two-dimensional Stokes (creeping) flow is assumed. The arrows in FIGS. 5 and 6 denote the magnitude and direction of the total velocity in the flow at various positions over the gauge. Comparative calculations show that 93% of the torque sensitivity of the cylindrical gauge 80 is retained for the buried gauge 70 whose thickness equals the cylindrical gauge diameter and whose streamwise length is three diameters. As noted above, the Reynolds number restriction on gauge size for the buried gauge 70 is essentially removed.

Figure 7A:
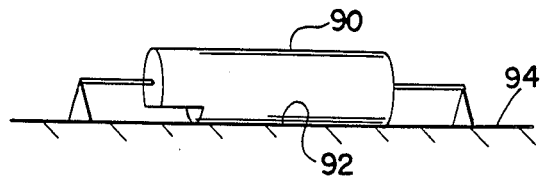
FIG. 7a is a schematic view of a test gauge in contact with a wall.
Figure 7B:
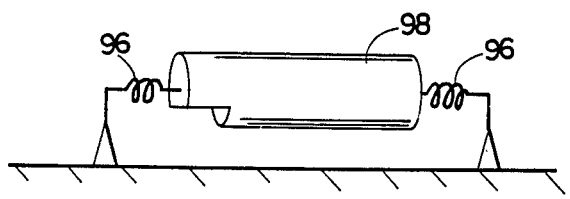
FIG. 7b depicts a test gauge which includes spiral torsional springs.

In other embodiments of the invention, a cylinder 90 may also be mounted so as to have a single line contact 92 with a wall 94 as shown in FIG. 7a. Or, rather than torsional springs of the type shown in FIG. 2, spiral torsional springs 96 may be used to support a cylinder 98 as shown in FIG. 7b.

What is claimed is:

1. Shear stress gauge comprising an elongate body having a longitudinal axis oriented transverse to fluid flow, the body disposed within the viscous sublayer of the turbulent boundary layer flow across a wall, the body further having a plane of symmetry, the plane of symmetry passing through the longitudinal axis of the body and normal to the wall;

apparatus for supporting and constraining the body for deflections about the longitudinal axis; and deflection measuring apparatus responsive to angular deflections about the longitudinal axis, the angular deflections substantially linearly related to shear stress on the wall.

2. The gauge of claim 1 wherein the body has a rectangular cross-section.

3. The gauge of claim 1 wherein the body has an elliptic cross-section.

4. The gauge of claim 1 wherein the body has a circular cross-section.

5. The gauge of claim 1 wherein the body is suspended above the wall.

6. The gauge of claim 1 wherein the body has a single line contact with the wall.

7. The gauge of claim 1 wherein the Reynolds number based upon its thickness and flow velocity at its centerline is less than 4.

8. The gauge of claim 1 wherein the apparatus for supporting the body comprises a pair of torsion bars extending from the ends of the body parallel to the longitudinal axis of the body.

9. The gauge of claim 1 wherein the apparatus for supporting the body comprises torsion spring apparatus including tensioned support wires extending in the direction of fluid flow.

10. The gauge of claim 1 wherein the apparatus for supporting the body includes spiral torsional springs.

11. The gauge of claim 1 wherein the apparatus for supporting the body includes apparatus responsive to angular deflections about the longitudinal axis adapted to drive the deflections to a null equilibrium orientation.

12. The gauge of claim 1 wherein the wall has a recess and the body is recessed in said recess.

* * * * *